United States Patent [19]

Althaus et al.

[11] Patent Number: 4,966,439

[45] Date of Patent: Oct. 30, 1990

[54] MOUNTING FOR A SUBSTANTIALLY SPHERICAL LENS IN A METAL TUBULE, AND METHOD FOR MAKING SUCH A MOUNTING

[75] Inventors: Hans-Ludwig Althaus, Lappersdorf; Andreas Greil, Munich, both of Fed. Rep. of Germany

[73] Assignee: Siemens Aktiengesellschaft, Berlin and Munich, Fed. Rep. of Germany

[21] Appl. No.: 330,337

[22] Filed: Mar. 29, 1989

[30] Foreign Application Priority Data

Mar. 31, 1988 [DE] Fed. Rep. of Germany ....... 3811032

[51] Int. Cl.$^5$ ................................................ G02B 7/02
[52] U.S. Cl. .................................... 350/253; 350/252; 350/96.18; 350/96.20; 350/320
[58] Field of Search ............... 350/252, 253, 245, 321, 350/96.15, 96.17, 96.18, 96.26, 96.28, 96.20, 320

[56] References Cited

U.S. PATENT DOCUMENTS

| | | | |
|---|---|---|---|
| 4,257,672 | 3/1981 | Balliet | 350/96.17 |
| 4,726,648 | 2/1988 | Haberland et al. | 350/96.20 |
| 4,824,202 | 4/1989 | Auras | 350/96.18 |
| 4,850,674 | 7/1989 | Hasselskog | 350/253 |

FOREIGN PATENT DOCUMENTS

| | | |
|---|---|---|
| 0191328 | 8/1986 | European Pat. Off. . |
| 57-161818 | 10/1982 | Japan . |
| 59-201005 | 11/1984 | Japan ................................. 350/253 |
| 61-131709 | 6/1986 | Japan . |

*Primary Examiner*—Bruce Y. Arnold
*Assistant Examiner*—Loha Ben
*Attorney, Agent, or Firm*—John F. Moran; Eugene S. Indyk

[57] ABSTRACT

A mounting of a substantially spherical lens in a metal tubule, in particular for optoelectronic modules in manufacturable mechanically stable and with low expense. The spherical lens (1) is fastened in the thin-walled metal tubule or in its inner front edge through press-fit in the form of a contracting-down or contracting-on or a springiness.

6 Claims, 1 Drawing Sheet

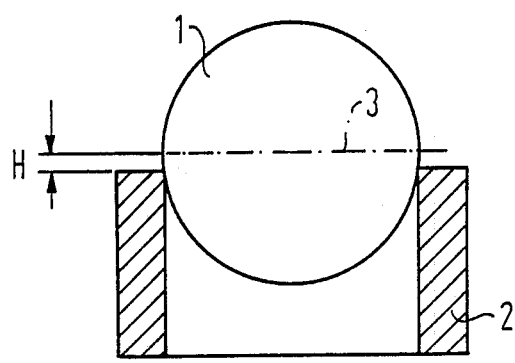

MOUNTING FOR A SUBSTANTIALLY SPHERICAL LENS IN A METAL TUBULE, AND METHOD FOR MAKING SUCH A MOUNTING

BACKGROUND OF THE INVENTION

1. Technical Field

The invention relates to a mounting for a substantially spherical lens in a metal tubule, in particular for optoelectronic modules, and a method for its production.

2. Description of the Prior Art

In electro-optical transducer modules for the optical information technology free-beam optics (for example spherical lenses) are used to an increasing extent for coupling light output from optical transmitters into light waveguide fibers and from the light waveguide fibers to the optical receivers.

For this purpose the optical imaging elements, in this case spherical lenses, must be mounted so as to be mechanically stable.

Freedom from the presence of exopy in the transducer modules rules out the use of an adhesive agent for fastening the lenses, e.g. spherical lenses. In the event that the mounting of the spherical lens takes place in the module, the manner of fastening need not be hermetically tight.

Heretofore several methods for mounting a spherical lens have been developed and also commercially applied:

For example, the spherical lens is metallized along a great circle and soldered hermetically tight and free of flux agents into the metal mounting.

Another technique involves glazing the spherical lens hermetically tight into a metal mounting with a suitable glass solder.

It has also already been suggested to glaze the spherical lens with glass solder on silicon into depressions produced through anisotropic etching.

These known mountings are, however, relatively expensive and have a complicated structure with respect to their manufacture or due to their applications a complicated structure.

The invention is based on the task of creating a mounting of a substantially spherical lens in a metal tubule, in particular for optoelectronic modules, as well as a method for its manufacture which not only is simple to carry out, connected with low complexity and therefore cost-efficient, but also permits economical serial production of spherical lens mountings which are distinguished through high mechanical stability with simple structure.

SUMMARY OF THE INVENTION

The above described problem and related problems of prior art mountings are solved by the present invention in that the substantially spherical lens comprises glass having a predetermined coefficient of thermal expansion and has a preselected outer diameter and that the metal tubule comprises a material whose coefficient of thermal expansion is greater than that of the glass of the spherical lens. Furthermore, the metal tubule is thin-walled and has an inner diameter which is slightly smaller than the outer diameter of the spherical lens, so that the spherical lens is fastened through press-fit. In a method for making the mounting the spherical lens is placed on an opening of the metal tubule. The metal tubule and the spherical lens are then heated to maximally the transformation temperature of the glass of the spherical lens. After bringing the spherical lens to a predetermined place on the metal tubule, the metal tubule is cooled.

The spherical lens mounting according to the invention is based on the different thermal expansions of the lens and the tubule. The material of the tubule, e.g. metal must herein have a greater coefficient of thermal expansion than that of the material of the lens, e.g. glass. Thin-walled metal tubules are manufactured with a smaller inner diameter than the outer diameter of the spherical lens. The metal tubule is put with its opening looking upwardly on a basis. The lens is, e.g. a spherical lens and is placed on the opening of the tubule. By heating the metal tubule and the spherical lens maximally to the transformation temperature of the glass of the spherical lens, the metal tubule expands so that the spherical lens fits into the metal tubule. The subsequent cooling down to room temperature creates a mechanically stable connection of the spherical lens with the metal. The equator of the spherical lens can herein be somewhat above the end of the metal tubule instead of below or at the level of it. The good seat of the spherical lens is therewith also ensured. Introducing the spherical lens into the metal tubule can, according to a further embodiment of the invention, also take place thereby that the metal tubule is resilient and the spherical lens with a corresponding force is pressed in and catches "cold".

A further embodiment of the invention features the metal tubule with slightly smaller diameter than that of the spherical lens being left at room temperature, i.e. cold, or is heated to approximately 600° C. and pressed over a spherical lens which is at room temperature or colder so that the metal tubule expands over the spherical lens and encloses it tightly above its great circle or upon cooling with the appropriate contraction encloses it tightly.

The advantages achieved according to the invention, in particular, provide the mounting of a spherical lens that is mechanically stable and free of any auxiliary connecting means such as metallizations, solders, glass solders, adhesive agents, in particular organic adhesive agents and the like. The mounting can be inexpensively produced and is variously applicable and, in particular, suitable for use in optoelectronic transducer modules.

BRIEF DESCRIPTION OF THE DRAWING

Additional features of the invention and additional objects of the invention will be more readily appreciated and better understood by reference to the following detailed description which should be considered in conjunction with the drawing.

The sole FIG. depicts an embodiment of the mounting according to the invention.

DETAILED DESCRIPTION

The spherical lens mounting shown in cross section in the Figure consists of the thin-walled metal tubule 2 of a material whose coefficient of thermal expansion is greater than that of the optical glass of the spherical lens 1. The inner diameter of the metal tubule 2 preferably comprises a Ni—Fe—or Ni—Fe—Co alloy that is smaller than the outer diameter of the spherical lens 1. By heating the metal tubule 2 and the spherical lens 1 to maximally the transformation temperature of the glass of the spherical lens 1, the metal tubule 2 expands so that the spherical lens 1 fits into the metal tubule 2. In this example the great circle 3 of the spherical lens 1 is slightly above the metal tubule 2, and specifically at a distance H above the front face of the metal tubule 2. The subsequent cooling provides for the mechanically stable press-fit of the spherical lens 1 due to thermal contraction of the metal tubule 2 on the lens.

There has thus been shown and described a novel mounting for a spherical lens which fulfills all the objects and advantages sought therefor. Many changes, modifications, variations and other uses and applications of the subject invention will, however, become apparent to those skilled in the art after considering this specification and the accompanying drawing which disclose an illustrative embodiment thereof. All such changes, modifications, variations and other uses and applications which do not depart from the spirit and scope of the invention are deemed to be covered by the invention which is limited only by the claims which follow.

We claim:

1. An optical coupling apparatus, comprising:
   a glass lens having a substantially spherical outer surface, a preselected outer diameter, and a predetermined coefficient of thermal expansion; and
   a thin-walled metal tubule having an opening in a front face of the tubule, the opening having an inner diameter which is slightly smaller than the outer diameter of the lens, the tubule comprising a material having a coefficient of thermal expansion which is greater than the coefficient of thermal expansion of the lens;
   the lens being fastened to the opening in the front face of the metal tubule by means of a press-fit such that a great circle around the outer surface of the lens is a predetermined distance above the front face of the tubule.

2. The apparatus of claim 1, in which the press-fit involves a compressional fit due to thermal contraction of the metal tubule about the lens after an application of heat to the metal tubule.

3. The apparatus of claim 1, in which the press-fit involves the resiliency of the material of the metal tubule producing a springiness press-fit.

4. The apparatus of claim 1, in which the material of the metal tubule is selected from the group consisting of NiFe or NiFeCo alloys.

5. A method of making an optical coupling, comprising the steps of:
   placing a substantially spherical lens in an opening in a front face of metal tubule;
   heating at least the metal tubule to a predetermined temperature;
   bringing the lens to a predetermined position in the opening in the front face of the metal tubule; and
   cooling the metal tubule such that the lens is press-fit in the opening in the front face of the tubule and a great circle of the lens is a predetermined distance above the front face.

6. The method of claim 5, in which the predetermined temperature is about 600° C.

* * * * *